June 23, 1942.  I. E. McCABE  2,287,494

MEANS FOR MOUNTING ROOM THERMOSTATS

Filed April 20, 1940

INVENTOR.
IRA E. McCABE
BY
ATTORNEY.

Patented June 23, 1942

2,287,494

UNITED STATES PATENT OFFICE 2,287,494

MEANS FOR MOUNTING ROOM THERMOSTATS

Ira E. McCabe, Chicago, Ill.

Application April 20, 1940, Serial No. 330,677

6 Claims. (Cl. 200—139)

This invention relates to improvements in remote controls usually known as room thermostats, for the control of electrically operated and controlled heating or air-conditioning systems. This invention relates more particularly to an improved means for mounting a room thermostat upon the wall of a dwelling or building.

With the increasing popularity of installing electrically operated and automatically controlled heating systems in dwellings and other buildings, it became more important to the manufacturer of the room thermostat, the only portion of such a heating system visible in the living room, to make it as unobtrusive as possible and enable it to be attached in place without damage to the wall of the dwelling. Since the desired temperature to be maintained in the room is directly dependent upon the room thermostat control, this control is naturally desired of an accuracy and sensitiveness that it will control the desired temperature with very little variation from the selected temperature and as a result controls of this character are generally constructed of light metals and of such little mass as possible as will minimize the effect of the temperature changes in the metal upon the thermostatic element which operates the control. As it is desirable to run the wires from the basement connecting the room thermostat to the control system behind the laths and plaster of the room in which it is installed, and pull the wires through a small opening in the wall in order to connect them to the instrument, and then secure the instrument in place by wood screws entering the laths, very often the wall would be defaced unless an exceptionally experienced and careful workman was employed. Furthermore, inexperience in installing such devices might so distort the relatively light metal casing, such as by bunching surplus wire behind the base in those cases where the wire must be first connected to the thermostat and then the thermostat mounted upon the wall, or by fastening the thermostat so securely that the base therefore would be warped, that the operating instrumentality would be thrown out of adjustment and the sensitivity and accuracy of the thermostat impaired.

It is an object of this invention to provide a wall bracket, or plate, to be secured to a wall and to which wires may be easily connected to secure tight electrical connections which will not be disturbed or loosened in the final mounting of the thermostat and to provide the bracket with contact locking means to facilitate the attachment or detachment of the thermostat upon the bracket in circuit with the electrical connections made upon the bracket, without disconnecting or connecting any wires thereto, thereby removing the hazard of impairing the operation of the thermostat by wiring or improper mounting and making the whole installation more neat and simplified and further, rendering possible at any time the removal of the thermostat from the wall without disturbing the electrical wiring of the control circuit.

It is a further object of this invention to provide means for securely attaching the instrument upon the mounted wall plate to insure a secure mounting and the proper electrical connection to the instrument and for the mounting of the thermostat upon the bracket to be such that, while the bracket may be slightly warped, when mounted upon an uneven surface, the thermostat is in no way affected and lies in a true plane.

With these and other objects in view, reference is made to the accompanying set of drawings which illustrates a preferred form of this invention with the understanding that minor changes may be made without departing from the scope thereof.

Figure 1:
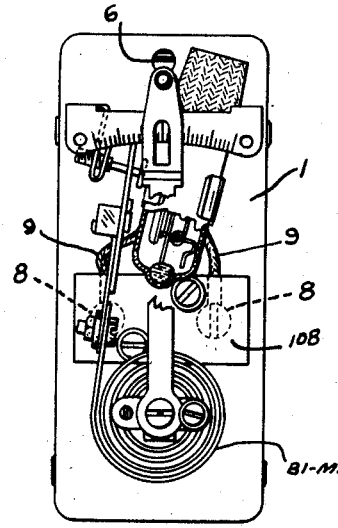
Figure 1 is a view in front elevation of a room thermostat, with the cover removed, before it is mounted upon the wall plate.
Figure 4:
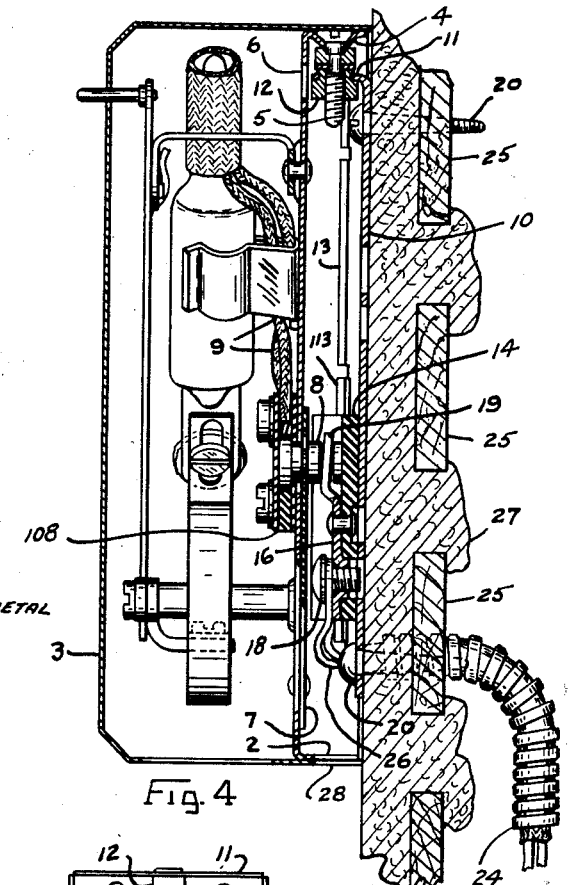
Figure 4 is a view illustrating the room thermostat with cover in place as mounted on the wall bracket plate and the plate secured to the wall and connected to the wires leading from the heating system, showing the wall, attached wall bracket plate and instrument cover in section, and the operating parts of the room thermostat in elevation.
Figure 2:
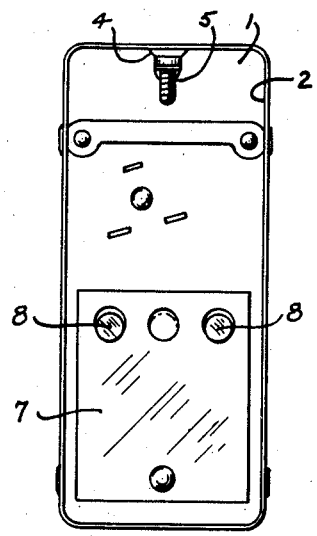
Figure 2 is a view in rear elevation of Figure 1.

The embodiment of this invention illustrated includes the operating parts of a room thermostat of commercial type mounted upon an elongated rectangular base 1, as shown in Figure 1. The base 1 is provided with a rearwardly extending peripheral flange 2, as shown in Figure 4, spacing the operating parts of the instrument away from the wall when installed. The cover 3 is constructed to receive snugly the base plate 1 with the side walls of the cover embracing the flange 2 of the base.

The central portion of the flange 2 at the top of the base 1 is provided with a depression 4 to receive the head of a securing screw 5 for attaching the base to the wall bracket plate, and the base 1 is provided with an opening 6 through which it may be observed when the base is properly secured. To the back of the base 1 adjacent its bottom, a plate of insulating material 7 is attached and through which protrudes two terminal studs 8 which pass through the base 1 and are insulated therefrom by an insulated block 108 in which they are embedded, and to which the wires 9 leading from the switch of the room thermostat are connected on the front side of the base, as shown in Figure 4.

Figure 3:
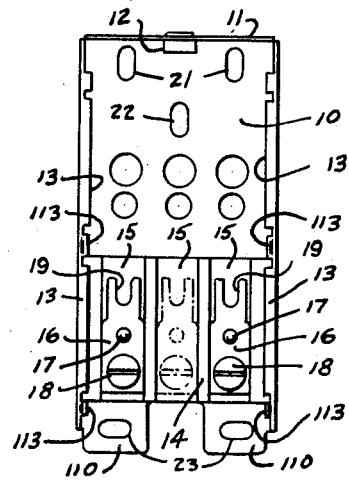
Figure 3 is a view in front elevation of a preferred form of wall bracket plate.

The wall bracket plate 10, as shown in Figure 3, is a rectangular plate of such dimensions as to be received within the flange 2 of the base 1 having an upstanding flange 11 across its top. The top flange 11 is provided with a central opening mounting an interiorly-threaded bushing 12 adapted to receive the screw 5, for the purpose hereinafter described. The bottom of the plate is cut out to form two depending ears 110 on each side of the center. The sides of the plate 10 are provided with in-turned flanges 13 to engage and secure the recessed edges of a plate 14 of insulating material, the bottom of which preferably terminates in line with the top of the cut out portion of the bottom of the wall bracket plate 10 and is locked in that position by forming the in-turned flanges 13 downwardly as at 113, below the top and bottom edges of the plate 14. The plate of insulating material 14 is preferably provided with three spaced-apart longitudinal grooves 15 for receiving and mounting terminal plates 16, preferably riveted by centrally located rivets 17 to the bottom of each groove, as shown in Figures 3 and 4. The bottom of each terminal plate 16 is preferably provided with a binding post 18 or terminal screw. The top of each terminal plate is provided with a forked offset 19 aligned with and adapted to receive the terminal studs 8 extending from the under side of the base 1, as shown in Figure 4. The wall bracket plate 10 is preferably provided with five elongated holes for adjusting the position of the plate upon the wall and securing the plate thereto in the proper position by wood screws 20. Two of the holes 21 are arranged one adjacent to each upper corner of the base plate 10, a third hole 22 is arranged below and between the upper two and one hole is arranged in each of the lower ears 110, as at 23.

In attaching the room thermostat to the wall of the dwelling, it is preferable to first test the wall to locate a lath, as the bottom screws must enter a lath to properly hold the wall bracket plate 10 in place. After locating a lath a hole is drilled through the plaster and lath of sufficient size to pull the cable 24 through the lath 25 to connect the ends of the wires 26 of the cable, to the terminal screw 18 on the wall bracket plate 10. The plate 10 is then placed against the wall with the ears 110 depending on each side of the hole in the wall, and wood screws 20 are inserted through the aperture 23 in the ears and screwed home through the plaster 27 and into the lath 25, as shown in Figure 4, to hold the bottom of the plate 10 firmly against the wall. Another wood screw 20 is inserted through the hole 21 or 22, as desired, to likewise secure the upper portion of the wall plate 10 in position and the wires are then properly secured in place by the terminal screws.

The room thermostat with cover removed is then placed over and above the wall bracket plate 10 so that the bottom of the screw 5 will be over the bushing 12 in the flange 11 on the top of the wall plate 10 and the terminal studs 8 aligned with the forked ends of the terminal plates 16. Upon rotating the screw 5 into the bushing 12, not only will the base 1 be drawn down over the wall plate 10 but the terminal studs 8 will be drawn into proper electrical connection with the forked ends 19 of the terminal plates 16 to positively connect the thermostat switch in circuit with the control circuit of the heating system. By looking through the hole 6 in the base plate, it can be determined when the screw 5 has been rotated sufficiently. It is also preferable to provide the bottom of the cover 3 and the bottom flange 2 of the base 1 with a notch 28 to receive the wires 26 if it is more desirable to place the wires to the control system upon the exterior of the wall and not behind it, as shown in Figure 4.

It is apparent that when the thermostat is attached in place upon the wall bracket that it is supported at three points upon the bracket, these being the bushing 12 at the top and the two forked ends 19 of plates 16 and, therefore, the base of the thermostat lies in a true plane regardless of any slight distortion which may be given to the wall bracket if mounted upon an uneven surface. When supported upon the bracket the flange 2 of the thermostat base plate is slightly removed from engagement with the surface of the wall.

Since the forked ends 19 of the plate 16 are resilient, the use of the center plate 16, when circuit connections require the use of three terminals, does not interfere with the advantages of the three-point mounting.

What I claim is:

1. A temperature responsive electric switch mechanism including a temperature responsive actuating means and an electric switch mechanism operated thereby carried on a base detachably mounted upon a spaced apart wall bracket plate for securing the instrument upon a support, said wall bracket plate provided with means for adjustably securing said plate upon the support, said wall bracket plate supporting terminals adapted to be connected in circuit with the circuit to be controlled by the switch mechanism, said base provided with electric contact studs connected to the terminals of the switch mechanism and arranged to engage the terminals on the wall bracket plate, and means for securing the base upon said wall bracket plate with the contact studs in engagement with the terminals on said plate and wherein the terminals adapted to be connected in circuit with the circuit to be controlled are mounted on a plate of insulation secured to the wall bracket plate and each terminal provided with a binding post at one end and an offset forked and adapted to receive and engage the contacts studs carried on the base.

2. A temperature responsive electric switch including a temperature responsive actuating mechanism and an electric switch operated thereby carried on a base detachably mounted upon a wall bracket plate for securing the instrument upon a support, said base having a peripheral flange spacing the base apart from said plate, said wall bracket plate provided with means for adjustably securing said plate upon a support, said base mounting a plurality of contact studs extending through a plate of insulation with the contact studs connected to the terminals of the switch, said wall bracket plate having a plurality of terminals adapted to receive and form an electric connection with said terminals and having binding posts for attachment to the wires of the circuit to be controlled by the switch, and means for engaging the base and terminal studs thereon to the wall bracket plate and terminals thereon including a screw mounted in the peripheral flange of the base above a threaded bushing mounted in an up-turned flange upon the top of the wall bracket plate whereby upon threading the screw into the bushing the base is drawn upon the wall bracket plate to engage the terminal studs with the terminals and cause the peripheral flange to embrace the wall bracket plate, said base having an aperture opposite the connection between the screw and bushing to disclose when the screw has been threaded home.

3. Means for mounting a room thermostat upon the wall of a building including, a wall bracket plate adapted to be secured to the wall, a base mounting the operating elements of a thermostat, said base having a peripheral flange adapted to embrace the wall plate, terminal plates carried upon the wall bracket plate adapted to be brought into engagement with terminal studs on the base connected to the switch mechanism of the thermostat, and means for drawing the base upon the wall bracket plate to embrace the wall bracket plate and engage the terminal studs with the terminal plates on the wall bracket plate and wherein the terminal plates on the wall bracket plate include forked ends adapted to receive the terminal studs on the base.

4. Means for mounting a room thermostat upon the wall of a building, including, a wall bracket plate adapted to be secured to the wall, a base mounting the operating elements of a thermostat, said base having a peripheral flange adapted to embrace the wall plate, terminal plates carried upon the wall bracket plate adapted to be brought into engagement with terminal studs on the base connected to the switch mechanism of the thermostat, and means for drawing the base upon the wall bracket plate to embrace the wall bracket plate and engage the terminal studs with the terminal plates on the wall bracket plate, and wherein the terminal plates carried on the wall bracket plate are mounted upon a plate of insulated material secured upon said plate, each terminal plate having a binding post thereon for connection to the wires of the circuit controlled by the thermostat and the opposite ends of said terminal plates forked to engage a terminal stud on the base.

5. The structure of claim 4, wherein the terminal studs extend through a plate of insulating material to engage the forked terminal plates on the wall bracket plate and provided on the opposite side of the insulation plate with means for connection with the wires of the thermostat switch.

6. Means for mounting a room thermostat upon the wall of a building, including a wall bracket plate adapted to be secured to the wall, a base mounting a thermostat structure having a high degree of operative sensitiveness, said base being of relatively thin metal and having a peripheral flange adapted to embrace the wall plate, terminal plates carried upon the wall bracket plate adapted to be brought into engagement with terminal studs on the base connected to the switch element of the thermostat, and means for connecting the base upon the wall bracket plate and drawing the terminal studs into engagement with the terminal plates on the wall bracket plate, said studs and connecting means comprising a three-point triangular support for the base when the latter is secured to the bracket whereby an uneven or distorted mounting of the bracket plate will not affect the relatively thin base sufficiently to impair the operative sensitiveness of the thermostatic structure mounted thereon.

IRA E. McCABE.